United States Patent [19]

Kataoka et al.

[11] 4,191,671

[45] Mar. 4, 1980

[54] ABRASION RESISTANT RUBBER COMPOSITIONS

[75] Inventors: Nobuyuki Kataoka, Tokyo; Takuya Takahashi, Odawara; Fujio Ohkawa, Yokohama; Shiro Anzai, Higashi-Murayama, all of Japan

[73] Assignee: Bridgestone Tire Company, Limited, Tokyo, Japan

[21] Appl. No.: 785,704

[22] Filed: Apr. 7, 1977

[30] Foreign Application Priority Data

Apr. 7, 1976 [JP] Japan .................... 51-38212

[51] Int. Cl.$^2$ .................... C08K 3/04; C08K 5/09; C08K 5/14
[52] U.S. Cl. .................... 260/23.7 M; 260/23.5 A; 260/23.7 H; 260/23.7 B; 260/42.32; 260/42.33; 260/42.34; 260/42.36; 260/752; 260/754; 260/763; 525/1; 525/4; 525/445
[58] Field of Search ............. 260/42.32, 879, 23.7 M, 260/23.5 A, 23.7 H, 23.7 B, 42.33, 42.34, 43.36, 752, 880, 754, 763

[56] References Cited

U.S. PATENT DOCUMENTS

| 2,662,874 | 12/1953 | Brown ............................... 526/21 |
| 3,438,933 | 4/1969 | Bartsch et al. .................. 260/998.14 |
| 3,909,473 | 9/1975 | Okamura et al. ................. 260/42.32 |
| 4,056,269 | 11/1977 | Pollitt et al. ..................... 260/42.32 |

FOREIGN PATENT DOCUMENTS 684497 4/1964 Canada ................................ 260/42.32

*Primary Examiner*—James H. Derrington
*Attorney, Agent, or Firm*—Sughrue, Rothwell, Mion, Zinn and Macpeak

[57] ABSTRACT

Novel abrasion resistant rubber compositions are disclosed. The compositions are prepared by curing the mixtures comprising a diene elastomer, an $\alpha,\beta$-ethylenically unsaturated carboxylic acid, a divalent metal compound, and an organic peroxide. When an unpolymerizable carboxylic acid is added to the mixture, the mechanical properties of the composition are improved. The addition of a carbon black to the mixtures brings about the improvement of weather-proofing property of the composition. The compositions are useful for the rubber stock of solid tires, snow removing plates and the like.

29 Claims, No Drawings

ABRASION RESISTANT RUBBER COMPOSITIONS

BACKGROUND OF THE INVENTION

This invention relates to abrasion resistant rubber compositions. Polyurethane rubbers have been known to be the most useful elastic materials having high hardness which require the abrasion resistance, for example, solid tires, snow removing plates, the rollers of rice-hulling machines, rubber screens, the parts of crawler, belt scrapers, spider couplings, various rollers, the parts of belt hoppers, sleeve hoses, shoot liners, and the like.

However, the polyurethane rubbers have various drawbacks, for example, the cost of the raw materials is high, the curing time is long, the physical properties at a low temperature are poor, the heat resistance is poor, and the abrasion resistance, flexing fatigue resistance and heat evolution characteristics are insufficient, so that the products produced from the polyurethane rubbers are not satisfactory as an industrial usage and the development of the other suitable materials has been demanded.

SUMMARY OF THE INVENTION

A primary object of the present invention is to provide novel abrasion resistant rubber compositions.

Another object of the present invention is to provide abrasion resistant rubber compositions having excellent physical properties at a low temperature and high heat resistance.

A further object of the present invention is to provide abrasion resistant rubber compositions having an excellent flexing fatigue resistance.

A still another object of the present invention is to provide abrasion resistant rubber compositions having an excellent heat evolution resistance under the dynamic condition.

Another object of the present invention is to provide abrasion resistant rubber compositions can be cured in a short time, where any conventional processing facilities are possible to use for production.

Another object is to provide rubber compositions having excellent mechanical properties, such as the tensile strength and elongation at break in addition to the various properties mentioned above.

A further object of the present invention is to provide abrasion resistant rubber articles, such as a solid tire and a snow removing plate from the abrasion resistant rubber compositions.

The present invention, in one embodiment thereof, relates to the provision of an abrasion resistant rubber composition prepared by heating and curing a mixture comprising (A) a diene elastomer, (B) an $\alpha,\beta$-ethylenically unsaturated carboxylic acid, wherein the ratio by weight of the component (A) to the component (B) is 87/13 to 55/45, (C) a divalent metal compound being present in quantities of 50 to 150 parts by weight per 100 parts by weight of the component (B), and (D) an organic peroxide being present in quantities of 0.3 to 5.0 parts by weight per 100 parts by weight of the combined weight of the compnents (A) and (B).

The present invention, in another embodiment, relates to the provision of an abrasion resistant rubber composition prepared by heating and curing a mixture in which an unpolymerizable carboxylic acid as a component (E) is added to the aforementioned components in quantities of 1.5 to 17 parts by weight per 100 parts by weight of the component (A). The addition of the component (E) improves not only mechanical properties but also flexing fatigue resistance of the composition. These improvements have never been attained in the conventional peroxide cure systems.

The present invention, in other embodiment, relates to the provision of abrasion resistant compositions prepared by heating and curing the mixtures, in which carbon black is added to the aforementioned composition in quantities of less than 50 parts by weight per 100 parts by weight of the component (A), for the improvement of weather-proof properties.

The composition in the invention shows the further improvement of the weather-proofing properties and the mechanical properties, when an amine compound and/or a phenol compound are added to the mixture in the amount of 0.1 to 4.0 parts by weight per 100 parts by weight of the combined weight of the components (A) and (B).

Consequently, the compositions in the present invention are preferably used for tire treads, the parts of tire beads and belts, V-shaped transmittion belts, rubber pads, various sealants and the like, to say nothing in the aforementioned field where polyurethane rubbers have been employed.

DESCRIPTION OF THE PREFERRED EMBODIMENT

The diene elastomers used in the practice of the invention as the component (A) may include natural rubber, homopolymeric elastomers of conjugated dienes, such as 1,3-butadiene, isoprene, chloroprene and the like, and copolymeric elastomers of the conjugated dienes with vinyl substituted aromatic hydrocarbon compounds, such as styrene, $\alpha$-methylstyrene, vinyltoluene and the like. These homopolymeric and copolymeric elastomers may also be used as the mixture of them, and as the mixture of these elastomers and other elastomers, such as isoprene-isobutylene copolymers, ethylene-propylene based terpolymers, and the like. Especially, polybutadienes (butadiene rubber), polyisoprenes (isoprene rubber), styrene-butadiene copolymers (styrene butadiene rubber) are preferably used. Cis 1,4-configuration in these diene homopolymers is preferably more than 30 percent by weight.

The $\alpha,\beta$-ethylenically unsaturated carboxylic acids used in the invention as the component (B) may include methacrylic acid, ethacrylic acid, acrylic acid, cinnamic acid, crotonic acid, maleic acid, fumaric acid, itaconic acid, and the like. Methacrylic acid is preferably used. The weight ratio of the component (A) to the component (B) should be in the range of 87/13 to 55/45. The rubber compositions including the component (A) of more than the specified range are impractical because of its lower hardness. The compositions including the component (A) of less than the specified range are, on the contrary, too hard and brittle for the practical usage. Unsaturated acid esters of component (B) with multifunctional alcohols, such as trimethylol propane trimethacrylate, may be employed together with the component (B) in the scope of the invention.

The divalent metal compounds used in the invention as the component (C) may include the compounds of zinc, magnesium, calcium, iron, cobalt and the like. The component (C) used in the invention may include the oxides, hydroxides and carbonates of these metals. Zinc oxide, especially activated zinc oxide is preferably used. The component (C) should be employed in quantities enough to neutralize all the carboxyl groups in the component (B). The composition thus may be changable according to the kind of the component (B), that is, a species of metal or the form of metal compound; the component (C) may be generally employed in quantities of 50 to 150 parts by weight per 100 parts by weight of the component (B). When the component (C) is compounded in a too large amount, especially, the elongation at break decreases.

The organic peroxides used in the invention as the component (D) may include dialkyl peroxides exemplified as below; dicumyl peroxide, di-t-butyl peroxide, 2,5-dimethyl-2,5-di-t-butylperoxy hexane, $\alpha,\alpha'$-bis-t-butylperoxy-p-diisopropylbenzene, 1,1-di-t-butyl-peroxy-3,3,5-trimethylcyclohexane and the like. Dicumyl peroxide and 1,1-di-t-butylperoxy-3,3,5-trimethyl-cyclohexane are generally used. The component (D) may be generally employed in quantities of 0.3 to 5.0 parts by weight per 100 parts of the combined weight of the components (A) and (B) which are polymerizable and/or crosslinkable.

The carboxylic acids used as the component (E), which are unpolymerizable and/or uncrosslinkable by the component (D), may be employed for the purpose of the further improving the mechanical properties, such as tensile strength, elongation and flexing fatigue resistance of the composition in the invention. The component (E) which may be preferably used includes the saturated aliphatic carboxylic acids, such as acetic acid, butyric acid, lauric acid, palmitic acid, stearic acid and the like, higher unsaturated aliphatic carboxylic acids, such as oleic acid and the like, alicyclic carboxylic acids such as naphthenic acid and aryl carboxylic acids, such as benzoic acid. The component (E) also may be used in the form of any metal salt. The metals of metals salts generally used include zinc, calcium, magnesium, aluminum, sodium and cobalt as examples. The improvement of the mechanical properties is recognized as addition of the component (E) of 1.5 to 17 parts by weight based on 100 parts by weight of the component (A).

The rubber compositions in the invention may be incorporated with a suitable carbon black as the component (F) according to circumstances for improvement of its weather-proofing properties.

High Abrasion Furnace (HAF) Black, HAF-Low Structure (LS) Black, and HAF-High Structure (HS) Black are preferably used as carbon blacks, although other blacks which may be commonly used in rubber industries are unrestrictedly employed. The component (F) is incorporated in quantities of less than 50%, preferably 5 to 30% by weight of the component (A) in view of processability.

Amine compounds and/or phenol compounds as a component (G) in the amount of 0.1 to 4.0 parts by weight per 100 parts by weight of the combined weight of the components (A) and (B) may be employed with the object of the further improvement of the weather-proofing properties as well as the mechanical properties of the composition. Amine compounds preferably used in the invention may include sec-aryl amines, such as N-phenyl-N'-isopropyl-p-phenylene diamine, phenyl-$\beta$-naphthylamine, diphenylamine, N,N'-diaryl-p-phenylene-diamines, and the like, and amine-ketone based compounds, such as polymerized 1,2-dihydro-2,2,4-trimethylquinolines and the like. Phenol compounds preferably used in the invention may include 2,6-di-tert-butyl-4-methylphenol, 4,4'-thiobis(6-tert-butyl-3-methyl) phenol, styrenated phenols and the like. N,N'-diaryl-p-phenylene diamines are especially preferable.

Other conventional fillers, such as silicas, sulfur, p-quinone dioxime and the like, which are added to the common rubber compositions also may be properly used.

The aforementioned components are mixed and cured by any conventional means. Curing of the composition is generally carried out at 110°–180° C.

The JIS hardness of the rubber composition in the invention is 70-95 degree, that is preferable on employing as the aforementioned use. The following examples illustrate more fully the scope of the invention.

EXAMPLE 1

The following ingredients were used for the manufacture of a solid tire.
BR01—79.8 parts
methyacrylic acid—20.2 parts
zinc oxide—24.6 parts
1,1-di-t-butylperoxy-3,3,5-trimethylcyclohexane (PTMH)—1.0 part BR01 is available from Japan Synthetic Rubber Co. Ltd., and is a polybutadiene of about 98% cis 1,4-configuration.

The polybutadiene which had been cut into pieces was mixed with methacrylic acid in which PTMH was dissolved, then the mixture was left to improve the mixing overnight. The swollen polybutadiene was mixed in a standard kneader, the zinc oxide was added thereto and the mixture was kneaded thoroughly to obtain a homogeneous rubber composition. Then, the composition was cast into a transfer mold for a solid tire, the size of which was 150 mm in diameter, 50 mm in width and 16 mm in thickness, and was cured for 45 minutes at 120° C. The cured tire is found to have a JIS hardness of 83 degrees. The abrasion reistance of the tire was measured under the following conditions: The tire was run on a drum having a diameter of 1 meter, which was equipped with an acrossing plate having a thickness of 1 mm and a width of 50 mm for 50 hours at a rate of 6 kilometers per hour under such conditions that a load was applied so as to cause 10 percent of flexion in the tire, the temperature of the tire was kept below 40° C. by means of coercive air blast and the slipping angle of the tire was adjusted to 5 degrees. The reduced weight of the tire was measured. The loss in weight by the running was found to be 3 grams.

EXAMPLE 2

The same procedure as Example 1 was repeated except that 78.5 parts of the polybutadiene and 21.5 parts of methacrylic acid were used, 16.2 parts of an activated zinc oxide was substituted for the regular oxide and 15.7 parts of HAF black was added to the composition. The JIS hardness of resultant solid tire was 88 degrees, and the loss in weight by the running was 0.5 gram.

Comparative Example 1

A solid tire was manufactured by using urethane materials as follows: A polyethylene adipate based and tolylene diisocyanate terminated prepolymer, "Cyanaprene A85" which was available from American Cyanamid Company, was premixed with 4,4'-methylene-bis(2-chloroaniline)(MOCA), in which the molar ratio of the amino groups in MOCA to the isocyanate groups in the prepolymer was adjusted to 0.9, then the mixture was cured in the same mold used in Example 1 for 16 hours at 100° C. The JIS hardness of the resultant tire was 85 degrees and the loss in weight in accordance with the same procedure as described in Example 1 was 20 grams.

Comparative Example 2

A prepolymer was prepared from 100 parts of a polyethylene adipate based glycol, Vulkollan 2000M which was available from Bayer Aktiengesellschaft in Germany, and 24.5 parts of 1,5-naphthalene diisocyanate, and then 4.5 parts of 1,4-butanediol was added to the prepolymer. The mixture was cured for 16 hours at 100° C. to prepare a solid tire in the same mold as Example 1. The JIS hardness of the tire was 90 degrees and the lost weight was 14 grams by the same running as described in Example 1.

The results of Examples 1-2 and Comparative Examples 1-2 illustrate that the solid tires in the invention are significantly superior to those of urethane rubber in the abrasion resistance, although of course both tires have suitable hardness.

EXAMPLE 3

The curing procedure in Example 1 was repeated except that the polybutadiene content and the methacrylic acid content were changed into 79.5 parts and 20.5 parts respectively, and 15.4 parts of an activated zinc oxide was substituted for the regular zinc oxide. A similar drum test as described in Example 1 was repeated, but the performance of the tire was evaluated as follows: A surface temperature and a inner temperature of the tire (as measures of the heat evolution) were observed after the drum running for 30 minutes, and the distance that the tire run until its burst under the continuous running was measured, where the drum was rotated at a rate of 36 kilometers per hour under the load of 250 kilograms and the room temperature of 38°±3° C.

The urethane rubber tire in Comparative Example 1 was evaluated in a similar manner as described above. The results are shown in Table I.

Table I

|  |  | Example 3 | Comparative Example 1 |
|---|---|---|---|
| Surface temperature | (°C.) | 59 | 70 |
| Inner temperature | (°C.) | 73 | 83 |
| Run distance | (km) | over 3,000 | 270 |

The results in Table I show the solid tire in the invention had a lower heat evolution and a longer life than those of the urethane rubber.

Example 4 and Comparative Example 3

A slab sheet of 2 mm in thickness was prepared using the ingredient in Example 1. A urethane rubber slab sheet was prepared similarly from the composition obtained in Comparative Example 1. The thermal characteristics of the cured rubber, such as tensile storage modulus (E'), loss tangent (tan δ), and glass transition temperature were measured by the viscoelastic spectrometer. The results are shown in Table II.

The good running ability of the solid tire at a lower temperature in the invention is seemed to be attributed the lower glass transition of the rubber composition compared with that of the urethane rubber temperature. The tire in the invention has also good properties at a higher temperature, the E' value in Table II, which result in a good running ability at a higher temperature.

Table II

|  |  | Example 4 | Comparative Example 3 |
|---|---|---|---|
| Glass transition temperature | (°C.) | −90 | −10 |
| E' at 170° C. | (kg/cm$^2$) | 450 | (melted) |
| tan δ at 20° C. |  | 0.032 | 0.13 |

EXAMPLES 5-7, Comparative Examples 4-5

Test pieces for a snow removing plate, whose compositions were shown in Table III, were provided by the curing in the mold for 60 minutes at 120° C., which were 70 mm in length, 60 mm in width and 30 mm in thickness. The specimens were fixed to the puller, and the bottoms of the specimen were contacted with a concrete-surfaced ground at an angle of 3°, where a load of 1.0 kg/cm$^2$ was applied to the specimens, then specimens were dragged at the rate of 5 kilometers per hour for 150 meters. The lost weight was measured.

The same procedure was applied to two urethane rubber pieces which were made by reacting 100 parts by weight of Vulkollan 2000M, 25 parts by weight of 1,5-naphthalene diisocyanate, and 5 parts by weight of 1,4-butanediol, for 16 hours at 100° C.

The results are set forth in Table III. These results show that the test pieces according to the invention have the better abrasion resistance than that of the urethane rubber.

Table III

|  | Example | | | Comparative Example | |
|---|---|---|---|---|---|
|  | 5 | 6 | 7 | 4 | 5 |
| Cis-1,4-polybutadiene (BR01) (parts by weight) | 80.0 | 80.0 | 80.0 |  |  |
| Methacrylic acid (parts by weight) | 20.0 | 20.0 | 20.0 |  |  |
| HAF black (parts by weight) | 15.0 | 15.0 | 15.0 |  |  |
| Zinc oxide, regular (parts by weight) | — | — | 15.0 |  |  |
| Zinc oxide, activated (parts by weight) | 15.0 | 15.0 | — |  |  |
| PTMH (parts by weight) | 1.0 | — | — |  |  |
| Dicumyl peroxide (parts by weight) | — | 1.0 | 1.0 |  |  |
| Curing temperature (°C.) | 120 | 130 | 140 | 100 |  |
| Curing time (minutes) | 60 | 60 | 30 | 960 |  |
| JIS hardness (degree) | 89 | 86 | 87 | not observed |  |
| Lost weight (g) | 6.5 | 2.0 | 3.4 | 9.0 | 15.0 |

EXAMPLES 8-10, Comparative Examples 6-7

A series of rubber compositions varying the ratio of the component (A) to the component (B) was prepared. A predetermined quantity of a butadiene "BR01" as the component (A), an activated zinc oxide as the component (C) of 75% by weight based on methacrylic acid as the component (B), dicumyl peroxide as the component (D) of 1.0% by weight based on the combined weight of the polybutadiene and the methacrylic acid stearic acid as component (E) of 3% by weight based on the polybutadiene, and HAF black as the component (F) of 20% by weight based on the polybutadiene were well premixed in a kneader, and a predetermined quantity of methacrylic acid was gradually added and mixed further. The mixture was cured in the slab mold having 2 mm in thickness for 30 minutes at 140° C.

The specimen of Comparative Example 6, a general peroxide-cured composition, was made by compounding 100 parts of "BR01", 50 parts of HAF black, 5 parts of regular zinc oxide, 2.5 parts of stearic acid and 1.0 part of an aminketone based antioxidant and 1.2 parts of DCP, which differs from other specimens in contents.

Each rubber composition was evaluated by measuring its JIS hardness, tensile strength and elongation at break. Flexing fatigue resistance was auxiliary employed for evaluation of the composition, wherein the flexing fatigue resistance means the number of flexion repetition until a crack appeared on the virgin specimen propagates from zero to 25 mm in length with De Mattia type of flex tester.

The results are set forth in Table IV. The numeral values showing "the rate of increase (%)" and "magnitude" in the parentheses in "Tensile strength", "Elongation at break point" and "Number of flexion repetition" in the following tables are values obtained by calculating the values on the basis of the values of these physical properties obtained when no stearic acid is added.

Comparative Example 8

The following ingredients were compounded to obtain a sulfur vulcanizable composition:

| | |
|---|---|
| Polybutadiene (BR01) | 100 parts |
| HAF black | 50 parts |
| Zinc oxide | 5 parts |
| Process oil | 5 parts |
| Antioxidant RD | 2 parts |
| Sulfur | 1.5 parts |
| Accelerator | 1.2 parts |
| Stearic acid | 2.5 parts |

Antioxidant RD is a polymerized 1,2-dihydro-2,2,4-trimethylquinoline, and the accelerator used is N-oxydiethylenebenzothyazolylsulfenamide. The composition was vulcanized for 30 minutes at 140° C. A reference sample which had a similar composition but lacked stearic acid was prepared in the same way. The vulcanized composition have the mechanical properties shown below and are little improved by the addition of stearic acid: The tensile strength is 150 kg/cm$^2$ which means only 4 percent increase, the elongation is 530 percent, 8 percent increase, and the number of flexion repetition is $1.0 \times 10^6$, 6 percent increase by the addition of stearic acid.

Table IV

| | Comparative Example | | Example | | |
|---|---|---|---|---|---|
| | 6 | 7 | 8 | 9 | 10 |
| Polybutadiene/methacrylic acid (the ratio by weight) | 100/0 | 90/10 | 85/15 | 75/25 | 60/40 |
| JIS hardness (degree) | 58 | 62 | 72 | 88 | 96 |
| Tensile strength (kg/cm$^2$) | 132 | 154 | 170 | 213 | 202 |
| (the rate of increase) (%) | (−3) | (1) | (20) | (28) | (15) |
| Elongation at break point (%) | 440 | 410 | 365 | 275 | 45 |
| (the rate of increase) (%) | (9) | (4) | (26) | (90) | (29) |
| Number of flexion repetition | $3.9 \times 10^6$ | $5.8 \times 10^5$ | $6.8 \times 10^4$ | $8.8 \times 10^3$ | not observed |
| (magnitude) | (1.1) | (1.4) | (3.6) | (4.2) | (—) |

The results in Table IV show that tensile strength, elongation as well as flexing fatigue resistance of the rubber compositions, in which the ratio of the butadiene to methacrylic acid is within the range of 87/13 to 55/45, are improved by the addition of stearic acid. However these properties of the compositions when the ratio of polybutadiene/methacrylic acid is less than 80/15, are not improved or are deteriorated.

EXAMPLES 11–17

The procedure of Example 8 was repeated except that various carboxylic acids were substituted for stearic acid, and the ratio of the polybutadiene to the methacrylic acid was fixed to 75/25. The results set forth in Table V show that other carboxylic acids have the same effect as stearic acid for the improvement of the mechanical properties.

Table V

| Examples | 11 | 12 | 13 | 14 | 15 | 16 | 17 |
|---|---|---|---|---|---|---|---|
| Kinds of carboxylic acid | Lauric acid | Palmitic acid | Oleic acid | Naphthenic acid | Butyric acid | Benzoic acid | Acetic acid |
| JIS hardness (degree) | 86 | 88 | 86 | 87 | 84 | 88 | 82 |
| Tensile strength (kg/cm$^2$) | 213 | 201 | 225 | 205 | 181 | 184 | 182 |
| (the rate of increase) (%) | (27) | (20) | (34) | (22) | (8) | (10) | (8) |
| Elongation at break (%) | 225 | 225 | 320 | 265 | 250 | 205 | 255 |
| (the rate of increase) (%) | (70) | (50) | (113) | (77) | (67) | (37) | (67) |
| Number of flexion repetition | $8.8 \times 10^3$ | not observed | $8.9 \times 10^4$ | $5.0 \times 10^3$ | $2.5 \times 10^4$ | $1.4 \times 10^4$ | not observed |
| (magnification) | (4.1) | | (41) | (2.3) | (12) | (6.4) | |

EXAMPLES 18-23

The procedure of Example 8 was repeated except that various metal salts of stearic acid were substituted for stearic acid, and the ratio of the polybutadiene to the methacrylic acid was fixed to 75/25. The results set forth in Table VI illustrate that the carboxylic acids added in the form of metal salt also effectively act on the improvement of the mechanical properties.

Table VI

| Examples | 18 | 19 | 20 | 21 | 22 | 23 |
|---|---|---|---|---|---|---|
| Kinds of metal of stearate | Zinc | Calcium | Magnesium | Aluminum | Sodium | Cobalt |
| JIS hardness (degree) | 87 | 87 | 88 | 90 | 89 | 89 |
| Tensile strength (kg/cm$^2$) | 208 | 214 | 210 | 228 | 233 | 194 |
| (the rate of increase) (%) | (24) | (27) | (25) | (36) | (39) | (16) |
| Elongation (%) | 250 | 270 | 260 | 265 | 285 | 225 |
| (the rate of increase) (%) | (67) | (80) | (73) | (77) | (90) | (50) |
| Number of flexion repetition | 6.8 × 10$^3$ | not observed | not observed | 6.7 × 10$^3$ | 5.6 × 10$^3$ | not observed |
| (magnification) | (3.2) | | | (3.1) | (2.6) | |

EXAMPLES 24-30, Comparative Example 9

The procedure of Example 8 was repeated except that stearic acid content was varied in order to clarify the extent of the effect on the mechanical properties, and the ratio of the polybutadiene to the methacrylic acid was fixed to 75/25. From the results shown in Table VII, it is concluded that stearic acid content is preferably in the range of 1.5 to 17 parts by weight per 100 parts of the polybutadiene. The tensile strength of the compositions containing stearic acid out of the specified range decreases or slightly increases.

The number of flexion repetition of the polyurethane rubber (Comparative Example 9) made by curing a mixture of a polyethylene adipate based and tolylene diisocyanate terminated prepolymer "Coronate 4047" which was available from Nihon Polyurethane Co., and 4,4'-methylene-bis(2-chloroaniline), wherein the ratio of NH$_2$/NCO and 0.95, is found to be 8.3×10$^2$.

As seen from a comparison of the number of flexion repetitions of the above described commercially available polyurethane rubber with the samples of the present invention shown in the following Table VII, the number of flexion repetitions of the samples of the present invention is larger than that of Comparative Example 9.

Table VII

| Examples | 24 | 25 | 26 | 27 | 28 | 29 | 30 |
|---|---|---|---|---|---|---|---|
| Stearic acid content* (parts) | 0 | 1.0 | 2.0 | 5.0 | 10.0 | 15.0 | 20.0 |
| JIS hardness (degree) | 88 | 88 | 88 | 86 | 86 | 84 | 83 |
| Tensile strength (kg/cm$^2$) | 168 | 186 | 207 | 208 | 203 | 232 | 162 |
| (the rate of increase) (%) | (standard) | (11) | (23) | (24) | (21) | (38) | (−4) |
| Elongation (%) | 150 | 190 | 220 | 240 | 280 | 350 | 330 |
| (the rate of increase) (%) | (standard) | (27) | (47) | (60) | (87) | (133) | (120) |
| Number of flexion repetition | 2.2 × 10$^3$ | 2.8 × 10$^3$ | 9.7 × 10$^3$ | not observed | not observed | 3.6 × 10$^5$ | not observed |
| (magnification) | (standard) | (1.3) | (4.5) | | | (167) | |

*Note:
Stearic acid content is based on 100 parts of the polybutadiene.

EXAMPLES 31 AND 32

The procedure of Example 8 was repeated except that a styrene-butadiene rubber and a polyisoprene rubber were substituted for the polybutadiene, and the ratio of the rubber to methacrylic acid was fixed to 75/25. The styrene-butadiene rubber used is available as SBR #1500, and the polyisoprene rubber used is Califlex 305 which is manufactured by Shell Oil Company.

As shown in Table VIII, styrene-butadiene rubbers and isoprene rubbers, especially isoprene rubbers, also have the effect on the improvement of the mechanical properties when stearic acid is added.

Table VIII

| Examples | 31 | 32 |
|---|---|---|
| Kinds of rubber | Styrene-butadiene copolymer | Polyisoprene |
| JIS hardness (degree) | 90 | 83 |
| Tensile strength (kg/cm$^2$) | 230 | 193 |
| (the rate of increase) (%) | (5) | (33) |
| Elongation (%) | 365 | 400 |
| (the rate of increase) (%) | (20) | (105) |
| Number of flexion repetition | 2.8 × 10$^4$ | 4.9 × 10$^4$ |
| (magnification) | (9.8) | (10) |

EXAMPLES 33 AND 34

A rubber composition as Example 33 was prepared by curing the following ingredients at 150° C. for 30 minutes:

| | |
|---|---|
| Polybutadiene (BR01) | 75 parts |
| Methacrylic acid | 25 parts |
| Activated zinc oxide | 18.75 parts |
| HAF black | 15 parts |
| Stearic acid | 2.25 parts |
| Nonflex TP | 0.325 parts |
| Dicumyl peroxide | 1.875 parts |

Nonflex TP is an N,N'-diaryl-p-phenylenediamine made by Seiko Chemical Co. Table IX shows the mechanical properties of the sample together with those of the sample (Example 34) not containing the N,N'-diaryl-p-phenylenediamine. The tensile strength and the elongation of the composition are increased by the addition of the N,N'-diaryl-p-phenylenediamine.

Table IX

| Examples | 33 | 34 |
|---|---|---|
| JIS hardness (degree) | 86 | 88 |
| Tensile strength (kg/cm$^2$) | 235 | 215 |
| Elongation (%) | 306 | 230 |

EXAMPLE 35

One hundred parts of a polybutadiene "BR01", 2.5 parts of stearic acid, 16 parts of zinc oxide and 21 parts of methacrylic acid were premixed in a Banbury mixer. After the addition of 1.3 parts of dicumyl peroxide, the mixture was well mixed on a roll. A solid tire having 180 mm in diameter, 50 mm in width and 15 mm in thickness was prepared by curing the mixture in a mold for 45 minutes at 135° C. The JIS hardness of the tire was 80 degree. The running test of the tire was carried out for 5,000 km on an iron plate having rough surface under the condition of the load of 250 kg and the speed of 30 km per hour. The thickness of the tire was decreased by 0.5 mm by the test.

Comparative Example 10

A solid tire was prepared from a polyoxytetramethyleneglycol based and tolylenediisocyanate terminated prepolymer, Coronate 4090, which was made by Nihon Polyurethane Company, and 4,4'-methylenebis(2-chloroaniline), wherein the ratio of $NH_2$ groups to NCO groups was 1.0. The mixture was cured for 16 hours at 100° C. in the same mold as used in Example 35. The MIS hardness of tire was 90 degree and the thickness of the tire was decreased by 1.3 mm by the same test as described in Example 35.

Example 35 and Comparative Example 10 show that the solid tire in the invention is superior in the abrasion resistance to that of polyurethane rubber.

What is claimed is:

1. An abrasion resistant rubber composition having improved mechanical properties and flexing fatigue resistance due to component (E) below, said composition prepared by heating and curing the mixture comprising
    (A) a diene elastomer,
    (B) an $\alpha,\beta$-ethylencially unsaturated carboxylic acid, wherein the ratio by weight of the component (A) to the component (B) is 87/13 to 55/45,
    (C) a divalent metal compound being present in quantities of 50 to 150 parts by weight per 100 parts by weight of the component (B),
    (D) an organic peroxide being present in quantities of 0.3 to 5.0 parts by weight per 100 parts by weight of the combined weight of the components (A) and (B), and
    (E) an unpolymerizable carboxylic acid or a metal salt of the unpolymerizable carboxylic acid being present in quantities of 1.5 to 17 parts by weight per 100 parts by weight of the component (A).

2. The composition according to claim 1, wherein the unpolymerizable carboxylic acid is selected from the class consisting of saturated aliphatic carboxylic acids, higher unsaturated carboxylic acids, alicyclic carboxylic acids, and aryl carboxylic acids.

3. The composition according to claim 2, wherein the saturated aliphatic carboxylic acid is selected from the class consisting of acetic acid, butyric acid, lauric acid, palmitic acid and steric acid.

4. The composition according to claim 2, wherein the higher unsaturated aliphatic carboxylic acid is oleic acid.

5. The composition according to claim 2, wherein the alicyclic carboxylic acid is naphthenic acid.

6. The composition according to claim 2, wherein the aryl carboxylic acid is benzoic acid.

7. The composition according to claim 1, wherein the metal of said metal salts of said unpolymerizable carboxylic acid is selected from the class consisting of zinc, calcium, magnesium, aluminum, sodium and cobalt.

8. An abrasion resistant composition having improved mechanical properties and flexing fatigue resistance due to component (E) below, said composition prepared by heating and curing the mixture comprising
    (A) a diene elastomer,
    (B) an $\alpha,\beta$-ethylenically unsaturated carboxylic acid, wherein the ratio by weight of the component (A) to the component (B) is 87/13 to 55/45,
    (C) a divalent metal compound being present in quantities of 50 to 150 parts by weight per 100 parts by weight of the component (B),
    (D) an organic peroxide being present in quantities of 0.3 to 5.0 parts by weight per 100 parts by weight of the combined weight of the components (A) and (B),
    (E) an unpolymerizable carboxylic acid or a metal salt of the unpolymerizable carboxylic acid being present in quantities of 1.5 to 17 parts by weight per 100 parts by weight of the component (A), and
    (F) a carbon black being present in quantities less than 50 parts by weight per 100 parts by weight of the component (A).

9. An abrasion resistant composition having improved mechanical properties and flexing fatigue resistance due to component (E) below, said composition prepared by heating and curing the mixture comprising
    (A) a diene elastomer,
    (B) an $\alpha,\beta$-ethylenically unsaturated carboyxlic acid, wherein the ratio by weight of the component (A) to the component (B) is 87/13 to 55/45,
    (C) a divalent metal compound being present in quantities of 50 to 150 parts by weight per 100 parts by weight of the component (B),
    (D) an organic peroxide being present in quantities of 0.3 to 5.0 parts by weight per 100 parts by weight of the combined weight of the components (A) and (B),
    (E) an unpolymerizable carboxylic acid or a metal salt of the unpolymerizable carboxylic acid being present in quantities of 1.5 to 17 parts by weight per 100 parts by weight of the component (A),
    (F) a carbon black being present in quantities less than 50 parts by weight per 100 parts by weight of the component (A), and
    (G) an amine compound or a phenol compound being present in quantities of 0.1 to 4.0 parts by weight per 100 parts of the combined weight of the components (A) and (B).

10. The composition according to claim 9, wherein the amine compound is selected from the class consisting of secondary aryl amines and amine-ketone based compounds.

11. The composition according to claim 10, wherein the secondary aryl amine is selected from the class consisting of N-phenyl-N'-isopropyl-p-phenylenediamine, phenyl-$\beta$-naphthylamine, diphenylamine, and N,N'-diaryl-p-phenylenediamines.

12. The composition according to claim 11, wherein the secondary aryl amine is an N,N'-diaryl-p-phenylenediamine.

13. The composition according to claim 10, wherein the amine-ketone based compound is a polymerized, 1,2-dihydro-2,2,4-trimethylquinoline.

14. The composition according to claim 9, wherein the phenol compound is selected from the class consisting of 2,6-di-tert-butyl-4-methylphenol, 4,4-thiobis(6-tert-butyl-3-methyl)phenol and styrenated phenols.

15. An abrasion resistant rubber article which comprises casting the composition as claimed in claim 1.

16. A solid tire which comprises casting the composition as claimed in claim 1.

17. A snow removing plate which comprises casting the composition as claimed in claim 1.

18. The composition according to claim 1, wherein the diene elastomer is selected from the class consisting of butadiene rubbers, isoprene rubbers and styrene-butadiene rubbers.

19. The composition according to claim 1, wherein the diene elastomer is selected from the class consisting of butadiene rubbers and isoprene rubbers.

20. The composition according to claim 1, wherein this cis-1,4 configuration of the diene elastomer is more than 30% by weight.

21. The composition according to claim 1, wherein the α,β-ethylenically unsaturated carboxylic acid is methacrylic acid.

22. The composition according to claim 1, wherein the divalent metal compound is selected from the class consisting of divalant compounds of zinc, magnesium, calcium, iron, and cobalt.

23. The composition according to claim 1, wherein the divalent metal compound is selected from the class consisting of oxides, hydroxides, and carbonates of the metals.

24. The composition according to claim 1, wherein the divalent metal compound is selected from the class consisting of zinc oxide and activated zinc oxide.

25. The composition according to claim 1, wherein the organic peroxide is selected from the glass consisting of dicumyl peroxide and 1,1-di-t-butylperoxy-3,3,5-trimethyl cyclohexane.

26. The composition according to claim 8, wherein the carbon black is present in quantities of 5 to 30 parts by weight per 100 parts by weight of component (A).

27. The composition according to claim 1 consisting essentially of the recited components.

28. The composition according to claim 8 consisting essentially of the recited components.

29. The composition according to claim 9 consisting essentially of the recited components.

* * * * *